(12) United States Patent
Zhang et al.

(10) Patent No.: US 9,668,286 B2
(45) Date of Patent: May 30, 2017

(54) METHOD FOR CONTROLLING CONNECTION BETWEEN USER EQUIPMENT AND NETWORK, AND MOBILITY MANAGEMENT ENTITY

(71) Applicant: Huawei Device Co., Ltd., Shenzhen (CN)

(72) Inventors: Jun Zhang, Beijing (CN); Guodong Xue, Shenzhen (CN); Mianhong Dai, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 140 days.

(21) Appl. No.: 14/585,501

(22) Filed: Dec. 30, 2014

(65) Prior Publication Data

US 2015/0117192 A1 Apr. 30, 2015

Related U.S. Application Data (63) Continuation of application No. PCT/CN2013/072009, filed on Feb. 28, 2013.

(30) Foreign Application Priority Data

Sep. 29, 2012 (CN) .......................... 2012 1 0370562

(51) Int. Cl.
*H04W 76/02* (2009.01)
*H04W 48/06* (2009.01)
(Continued)

(52) U.S. Cl.
CPC ........... *H04W 76/02* (2013.01); *H04W 48/06* (2013.01); *H04W 76/027* (2013.01); *H04W 4/005* (2013.01); *H04W 8/06* (2013.01)

(58) Field of Classification Search
CPC ................. H04W 4/005; H04W 48/06; H04W 76/02–76/028
See application file for complete search history.

(56) References Cited

U.S. PATENT DOCUMENTS 8,565,242 B2  10/2013  Wu et al.
8,625,506 B2  1/2014  Chin
(Continued)

FOREIGN PATENT DOCUMENTS

CN   101610494 A   12/2009
CN   102111847 A   6/2011
(Continued)

OTHER PUBLICATIONS

Foreign Communication From A Counterpart Application, Chinese Application No. 201210370562.6, Chinese Office Action dated Apr. 25, 2016, 4 pages.
Foreign Communication From A Counterpart Application, Chinese Application No. 201210370562.6, Chinese Search Report dated Apr. 14, 2016, 2 pages.
(Continued)

*Primary Examiner* — Timothy J Weidner
(74) *Attorney, Agent, or Firm* — Conley Rose, P.C.

(57) ABSTRACT

A method for controlling a connection between a user equipment and a network, and a mobility management entity. The method includes: receiving, by a mobility management entity, a network connection request sent by a user equipment; determining a priority of the network connection request and a network overload state; and controlling a connection between the user equipment and a network according to the priority of the network connection request and the network overload state. The mobility management entity according to the embodiments of the present invention can selectively control the connection between the user equipment and the network by determining the priority of the network connection request and the network overload state.

10 Claims, 6 Drawing Sheets

(51) Int. Cl.
  *H04W 8/06* (2009.01)
  *H04W 4/00* (2009.01)

(56) References Cited

U.S. PATENT DOCUMENTS

| | | |
|---|---|---|
| 2009/0209202 A1 | 8/2009 | Martini et al. |
| 2012/0063305 A1 | 3/2012 | Chiu et al. |
| 2012/0218889 A1 | 8/2012 | Watfa et al. |
| 2013/0279330 A1 | 10/2013 | Feng et al. |

FOREIGN PATENT DOCUMENTS

| | | |
|---|---|---|
| CN | 102333343 A | 1/2012 |
| EP | 2469944 A1 | 6/2012 |
| EP | 2555562 A1 | 2/2013 |
| EP | 2775754 A1 | 9/2014 |
| WO | 2011134378 A1 | 11/2011 |
| WO | 2012111993 A2 | 8/2012 |

OTHER PUBLICATIONS

Foreign Communication From A Counterpart Application, European Application No. 13841822.3, Extended European Search Report dated Jul. 7, 2015, 11 pages.
Partial English Translation and Abstract of Chinese Patent Application No. CN101610494A, Part 1, Sep. 12, 2014, 43 pages.
Partial English Translation and Abstract of Chinese Patent Application No. CN101610494A, Part 2, Sep. 12, 2014, 11 pages.
Foreign Communication From A Counterpart Application, PCT Application No. PCT/CN2013/072009, English Translation of International Search Report dated Jul. 11, 2013, 2 pages.
Foreign Communication From A Counterpart Application, PCT Application No. PCT/CN2013/072009, Written Opinion dated Jul. 11, 2013, 6 pages.
"3rd Generation Partnership Project; Technical Specification Group Services and System Aspects; General Packet Radio Service (GPRS) enhancements for Evolved Universal Terrestrial Radio Access Network (E-UTRAN) access (Release 11)," 3GPP TS 23.401, V11.3.0, Technical Specification, Sep. 2012, 283 pages.
"Reply LS on the Introduction of Full-Moon-Geran Feature," 3GPP TSG GERAN, SA WG2 Meeting #S2-90, Apr. 16-20, 2012, 1 page.

METHOD FOR CONTROLLING CONNECTION BETWEEN USER EQUIPMENT AND NETWORK, AND MOBILITY MANAGEMENT ENTITY

CROSS-REFERENCE

This application is a continuation of International Application No. PCT/CN2013/072009, filed on Feb. 28, 2013, which claims priority to Chinese Patent Application No. 201210370562.6, filed on Sep. 29, 2012, both of which are hereby incorporated by reference in their entireties.

TECHNICAL FIELD

The present invention relates to the field of communications, and in particular, to a method for controlling a connection between a user equipment and a network and a mobility management entity for controlling a connection between a user equipment and a network.

BACKGROUND

With the development of 3rd-generation mobile communications (3G) technologies, application in Machine-to-Machine (M2M) communications becomes extensive. A corresponding name of M2M in a 3rd Generation Partnership Project (3GPP) system is machine type communications (MTC), which is a short name of machine-to-machine communications. The M2M communications is applied to various communications networks, such as the Internet, an industry network, and a communications network. Technologies of machine-to-machine and machine-to-mobile phone data communication and interaction are implemented by sensing and processing application information of devices for M2M communications. M2M communications extends a communication range of an existing information and communications network, and by deploying M2M devices having sensing and processing capabilities, information transmission, collaboration, and processing are implemented by means of network facilities, so that various applications such as logistics management, electricity meter reading, and security and health monitoring may conveniently acquire various required information.

An M2M device does not have a high requirement for real-time quality, so that a single network connection having a low priority is usually established between the M2M device and a network, and a connection between a user equipment and the network cannot be selectively controlled according to an emergency state of actual service data.

SUMMARY

Embodiments of the present invention provide a method for controlling a connection between a user equipment and a network, and a mobility management entity, which can selectively control a connection between a user equipment and a network according to an emergency state of service data.

According to a first aspect, a method for controlling a connection between a user equipment and a network is provided, and includes: receiving, by a mobility management entity, a network connection request sent by a user equipment; determining, by the mobility management entity, a priority of the network connection request and a network overload state; and controlling, by the mobility management entity, a connection between the user equipment and a network according to the priority of the network connection request and the network overload state.

In a first possible implementation manner of the first aspect, the controlling, by the mobility management entity, a connection between the user equipment and a network according to the priority of the network connection request and the network overload state includes rejecting, by the mobility management entity, a network connection request having a low priority according to that the priority of the connection request is the low priority and the network is overloaded, and sending, to the user equipment, a rejecting message carrying a back-off time.

With reference to the first possible implementation manner of the first aspect, in a second possible implementation manner, after the sending, by the mobility management entity to the user equipment, a rejecting message carrying a back-off time, the method further includes receiving, by the mobility management entity in the back-off time, a second network connection request sent by the user equipment; and when the mobility management entity determines that a priority of the second network connection request is a non-low priority, sending a timing stop instruction to the user equipment, and controlling establishment of a connection having a non-low priority between the user equipment and the network.

In a third possible implementation manner of the first aspect, the controlling, by the mobility management entity, a connection between the user equipment and a network according to the priority of the network connection request and the network overload state includes, when the mobility management entity determines that the priority of the connection request is a low priority or a non-low priority, and determines that the network is not overloaded, controlling establishment of a connection having a corresponding priority between the user equipment and the network.

With reference to the second possible implementation manner or the third possible implementation manner of the first aspect, in a fourth possible implementation manner, the controlling, by the mobility management entity, establishment of a connection having a non-low priority between the user equipment and the network includes, when the mobility management entity determines, according to subscription information of the user equipment, that the user equipment does not belong to a preset user equipment group, controlling establishment of a bearer having a non-low priority or a Packet Data Network (PDN) connection having a non-low priority between the user equipment and the network.

With reference to the second possible implementation manner or the third possible implementation manner of the first aspect, in a fifth possible implementation manner, the controlling a connection between the user equipment and the network includes, when the mobility management entity determines, according to subscription information of the user equipment, that the user equipment belongs to a preset user equipment group, controlling establishment of a public bearer having a non-low priority or a public PDN connection having a non-low priority between the user equipment and the network.

With reference to the first aspect or any one of the foregoing possible implementation manners, in a sixth possible implementation manner, the controlling a connection between the user equipment and a network according to the priority of the network connection request and the network overload state includes, when the mobility management entity determines that the priority of the network connection request is a non-low priority, and determines that the number of user equipment having established connections having a non-low priority to the network exceeds a limit value, rejecting the connection request having a non-low priority sent by the user equipment.

With reference to the first aspect or any one of the foregoing possible implementation manners, in a seventh possible implementation manner, the determining, by the mobility management entity, a priority of the network connection request includes, when the mobility management entity determines that the network connection request carries priority information, determining the priority of the network connection request according to the priority information.

With reference to the seventh possible implementation manner of the first aspect, in an eighth possible implementation manner, the determining the priority of the network connection request according to the priority information includes determining, by the mobility management entity, the priority of the network connection request according to a correspondence between an access point name (APN) and a priority in the priority information.

With reference to any one of the first to seventh possible implementation manners of the first aspect, in a ninth possible implementation manner, the determining, by the mobility management entity, a priority of the network connection request includes, when the mobility management entity determines that the network connection request does not carry priority information, determining that the priority of the network connection request is a non-low priority.

With reference to the first aspect or any one of the foregoing possible implementation manners, in a tenth possible implementation manner, the determining, by the mobility management entity, a network overload state includes: determining, by the mobility management entity, the network overload state according to an idle state of network resources; and/or determining, by the mobility management entity, the network overload state according to a network overload control command.

According to a second aspect, a mobility management entity is provided, and includes a transmission module, a determining module, and a control module, where the transmission module receives a network connection request sent by a user equipment; the determining module determines a priority of the network connection request and a network overload state; and the control module controls a connection between the user equipment and a network according to the priority of the network connection request and the network overload state.

In a first possible implementation manner of the second aspect, that the control module controls a connection between the user equipment and a network according to the priority of the network connection request and the network overload state includes: the control module rejects a network connection request having a low priority according to that the priority of the connection request is the low priority and the network is overloaded, and sends, to the user equipment, a rejecting message carrying a back-off time.

With reference to the first possible implementation manner of the second aspect, in a second possible implementation manner, after the control module sends, to the user equipment, a rejecting message carrying the back-off time, the control module receives, in the back-off time, a second network connection request sent by the user equipment; and when the control module determines that a priority of the second network connection request is a non-low priority, the control module sends a timing stop instruction to the user equipment, and controls establishment of a connection having non-low priority between the user equipment and the network.

According to a third aspect, a user equipment is provided, and includes a transmission module, a timing module, and a control module, where the transmission module sends a network connection request to a mobility management entity; the transmission module receives a rejecting message which carries a back-off time and is sent by the mobility management entity; the timing module starts a timer according to the back-off time in the rejecting message; and the control module, in the back-off time, forbids the user equipment to send a network connection request having a low priority, and allows the user equipment to send a network connection request having a non-low priority to the mobility management entity.

In a first possible implementation manner of the third aspect, the network connection request carries priority information, or does not carry priority information.

With reference to the third aspect or the first possible implementation manner of the third aspect, in a second possible implementation manner, that the control module allows, in the back-off time, the network connection request having a non-low priority to be sent to the mobility management entity includes: the control module controls, in the back-off time, the user equipment to send the network connection request having a non-low priority to the mobility management entity when the user equipment acquires service data having a non-low priority.

With reference to the second possible implementation manner of the third aspect, in a third possible implementation manner, after the control module controls the user equipment to send the network connection request having a non-low priority to the mobility management entity, the control module stops timing of the timer according to timing stop signaling sent for the network connection request having a non-low priority by the mobility management entity.

According to the embodiments of the present invention, the mobility management entity (MME) may selectively control the connection between the user equipment and the network by determining the priority of the network connection request and the network overload state.

BRIEF DESCRIPTION OF DRAWINGS

To describe the technical solutions in the embodiments of the present invention more clearly, the following briefly introduces the accompanying drawings required for describing the embodiments. The accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. The described embodiments are a part rather than all of the embodiments of the present invention. All other embodiments obtained by a person of ordinary skill in the art based on the embodiments of the present invention without creative efforts shall fall within the protection scope of the present invention.

It should be understood that, communication between M2M devices according to the embodiments of the present invention may be applied to various communications systems, for example, a Global System for Mobile Communications (GSM) system, a Code Division Multiple Access (CDMA) system, a Wideband Code Division Multiple Access (WCDMA) system, a General Packet Radio Service (GPRS) system, a Long Term Evolution (LTE) system, an Advanced Long Term Evolution (LTE-A) system, and the Universal Mobile Telecommunications System (UMTS), which are not limited in the embodiments of the present invention.

Figure 1:
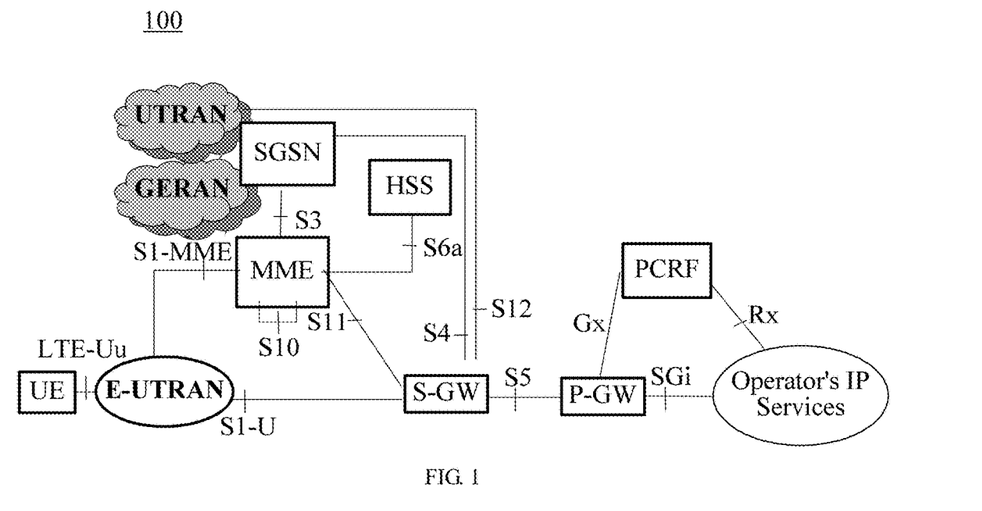
FIG. 1 is an application scenario diagram of a communications system according to a first embodiment of the present invention, where a mobility management entity (MME) controls a connection between a user equipment and a network.

FIG. 1 is an application scenario diagram of a communications system according to a first embodiment of the present invention, where a connection between a user equipment and a network is controlled.

As shown in FIG. 1, the communications system according to the embodiment of the present invention is described by using an Evolved Packet System (EPS) applied to the 3GPP as an example. The EPS includes: an Evolved Universal Terrestrial Radio Access Network (E-UTRAN), a Mobility Management Entity (MME), a Serving Gateway (S-GW), a Packet Data Network Gateway (P-GW), a Home Subscriber Server (HSS), a 3GPP Authentication, Authorization and Accounting (AAA) server, a Policy and Charging Rules Function (PCRF) and other support nodes.

The MME is responsible for functions, such as mobility management, processing of non-access-stratum (NAS) signaling, control plane related operations such as management of a user mobility context, reachability management for a mobile terminal in an idle state selected by the P-GW and the S-GW, and selecting of a tracking area list.

The S-GW is an access gateway device and is connected to the E-UTRAN, and functions of the S-GW include serving as a local anchor point switching between evolved nodeBs (eNodeB), forwarding data between the E-UTRAN and the P-GW, being responsible for caching paging waiting data, lawful interception, data packet routing, and inter-operator accounting based on a user and a quality of service (QoS) class identifier (QCI).

The P-GW is a border gateway between the EPS and a PDN, and functions of the P-GW include packet filtering, lawful interception, mobile terminal address allocating, and transport layer packet QoS tag that are user-based, service-based uplink and downlink accounting, downlink rate guarantee based on an aggregate maximum bit rate (AMBR), Dynamic Host Configuration Protocol Version4/Version 6 (DHCP v4/v6), and downlink rate guarantee for a cumulative maximum bit rate (MBR) based on a same guaranteed bit rate (GBR) QCI; in addition, the P-GW is further responsible for binding uplink and downlink bearers.

The EPS supports interworking with a non-3GPP system, and the P-GW is used as an anchor point between the 3GPP system and the non-3GPP system.

The user equipment in the embodiment of the present invention may be an M2M device, for example, a fixed or mobile machine-to-machine communications device such as a temperature tester, or a water/electricity meter.

The MME in the embodiment of the present invention controls a connection between a user equipment and a network according to a network connection request of the user equipment, and a specific technical solution is described in the following.

Figure 2:
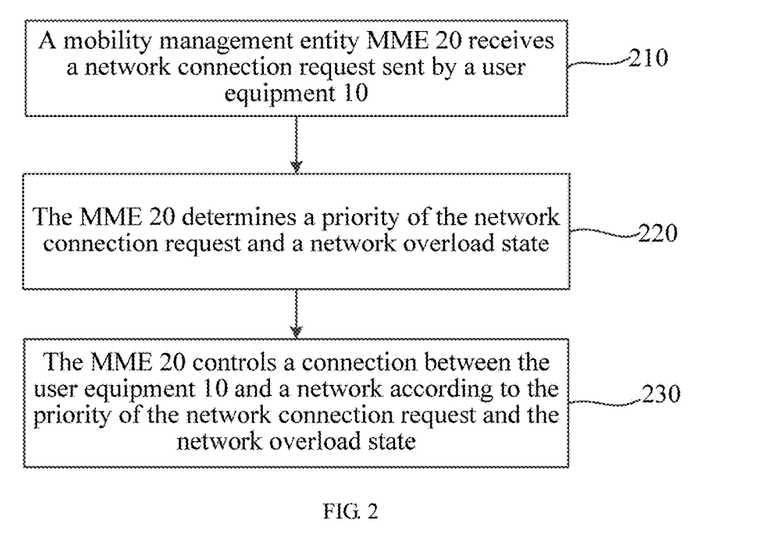
FIG. 2 is a flowchart of a method used by the MME to control the connection between the user equipment and the network according to the first embodiment of the present invention in FIG. 1.

FIG. 2 is a flowchart of a method used by the MME to control the connection between the user equipment and the network according to the first embodiment of the present invention in FIG. 1.

Step 210: A mobility management entity MME 20 receives a network connection request sent by a user equipment 10.

Step 220: The MME 20 determines a priority of the network connection request and a network overload state.

Specifically, that the MME 20 determines a priority of the network connection request includes: the MME 20 determines whether the network connection request carries priority information; and if priority information is carried, the priority of the network connection request is determined according to the priority information; if the priority information is not carried, it is determined that the priority of the network connection request is a non-low priority.

Figure 3:
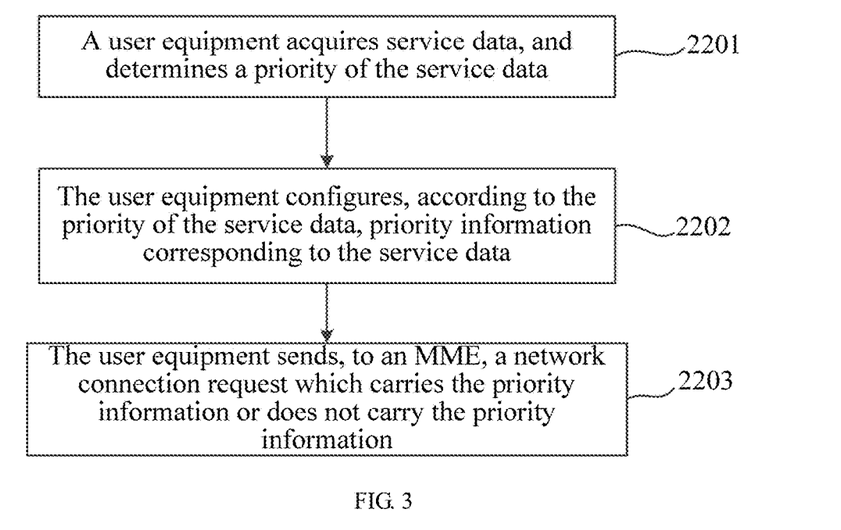
FIG. 3 is a flowchart of a method for configuring priority information according to the first embodiment of the present invention.

The priority information is preconfigured in the user equipment 10. Referring to FIG. 3, FIG. 3 is a flowchart of a method used by the user equipment 10 to configure a priority.

The method used by the user equipment 10 to configure the priority information includes:

Step 2201: The user equipment 10 acquires service data, and determines a priority of the service data.

It can be understood that, the service data may be meter reading data of a water/electricity meter, temperature/humidity data of a temperature/humidity detector, or the like.

In this embodiment, the priority of the service data includes at least two types of priorities. An example in which priorities of the service data are a low priority and a non-low priority is used. For example, a priority of normal service data is corresponding to service data having a low priority, and a priority of abnormal service data may be corresponding to service data having a non-low priority.

Specifically, the user equipment 10 acquires the service data, determines whether a numerical value of the acquired service data exceeds a threshold, and if the numerical value does not exceed the threshold, it is defined that the priority of the service data is a low priority; if the numerical value exceeds the threshold, it is defined that the priority of the service data is a non-low priority.

For example, the service data is temperature monitoring data of device, and the threshold is predetermined as 40 degrees. If temperature data acquired by the user equipment 10 exceeds 40 degrees, it is determined that the temperature data is abnormal service data, and it is defined that the priority of the abnormal service data is a non-low priority; if the temperature does not exceed 40 degrees, it is determined that the temperature data is normal service data, and it is defined that the priority of the normal service data is a low priority.

It can be understood that, a threshold preset by the user equipment 10 may also be a predetermined range. Further, the user equipment 10 determines whether the numerical value of the acquired service data falls within the predetermined range; if yes, it is determined that the priority of the service data is a low priority; otherwise, it is determined that the priority of the service data is a non-low priority. In the embodiment of the present invention, a division manner of the threshold is not limited thereto, and other division manners which can clearly indicate a priority range of the service data are all applicable to the embodiment of the present invention.

It can be understood that, the priority of the service data may also include a low priority and a non-low priority, where the non-low priority may further include a medium priority and a high priority. For setting a priority level, multiple levels may be set according to actual needs. The priority in the embodiment of the present invention is not limited to the low priority and the non-low priority, and the two types of priorities are merely used as an example for description.

Step 2202: The user equipment 10 configures, according to the priority of the service data, the priority information corresponding to the service data.

Specifically, an example in which the priority of the service data has a dual priority is used. The user equipment 10 may newly add a priority parameter in advance in an attribute of the user equipment 10 according to a user operation. In this embodiment, after the user equipment 10 acquires the service data, the newly added priority parameter is searched for in attribute information of the user equipment 10, and a parameter value corresponding to the priority is configured according to the priority of the service data. As shown in Table 1, for example, if the parameter value is 11, 1 in the tens digit place indicates that the service data is service data having a dual priority, and 1 in the ones digit place indicates the priority of the service data is a non-low priority; if the parameter value is 10, 1 in the tens digit place indicates that the service data is service data having a dual priority, and 0 in the ones digit place indicates that the priority of the service data is a low priority.

TABLE 1

| Newly added priority parameter | Parameter value | Descriptions |
|---|---|---|
| Dual Priority | 11 | Non-low priority of a dual priority |
| Dual Priority | 10 | Low priority of a dual priority |

Optionally, an M2M device 10 may also add the priority information of the service data in a reserved bit of sent NAS signaling. Corresponding numerical values are set in different idle bits to indicate the priority of the service data. For a method for setting the priority, refer to Table 2 to Table 3. The NAS signaling may be the network connection request carrying the priority information, and the priority of the service data is corresponding to the priority of the network connection request.

TABLE 2

| 8 | 7 | 6 | 5 | 4 | 3 | 2 | 1 |
|---|---|---|---|---|---|---|---|
| Attribute information bits | | | | 0 Idle bit | 0 Idle bit | 1 Idle bit | 1 Idle bit |

TABLE 3

| 8 | 7 | 6 | 5 | 4 | 3 | 2 | 1 |
|---|---|---|---|---|---|---|---|
| Attribute information bits | | | | 0 Idle bit | 0 Idle bit | 1 Idle bit | 0 Idle bit |

As shown in Table 2 to Table 3, for example, the attribute information of the user equipment 10 is an 8-bit binary number, where the $5^{th}$ to $8^{th}$ bits in the 8 bits are used for indicating the attribute information, and the $1^{st}$ to $4^{th}$ bits are idle bits. In the embodiment of the present invention, in the $1^{st}$ to $4^{th}$ bits, the $1^{st}$ idle bit may be set as the numerical value 1, the $2^{nd}$ idle bit may be set as the numerical value 1, the other idle bits are 0, and 0011 indicates that the service data has a characteristic of a dual priority, and the priority of the service data is a non-low priority; or the $1^{st}$ idle bit in the $1^{st}$ to $4^{th}$ bits is set as the numerical value 0, the $2^{nd}$ idle bit is set as a numerical value 1, the other idle bits are 0, and 0010 indicates that the service data has a characteristic of a dual priority, and the priority of the service data is a low priority.

It can be understood that, a manner of setting a priority indication in idle bits of the attribute information is not limited thereto, and may include multiple permutations and combinations to indicate the priority information. For example, both 1000 and 1100 indicate that the service data has a characteristic of a dual priority, and priorities of the service data are a low priority and a non-low priority separately.

It can be further understood that, the priority information may also merely indicate a priority of acquired service data. For example, in Table 1, the parameter value 11 indicates that the priority of the service data is a non-low priority, and the parameter value 10 indicates that the priority of the service data is a low priority. In Table 2 to Table 3, the reserved bit value 0010 of an attribute information of the user equipment indicates that the priority of the service data is a low priority, and 0011 indicates that the priority of the service data is a non-low priority.

Step 2203: The user equipment 10 sends, to the MME 20, a network connection request which carries the priority information or does not carry the priority information.

In this embodiment, a type of the network connection request initiated by the user equipment 10 to the MME 20 may be an attach connection request, a PDN connection request, a mobility management message, a session management message, or the like. The connection request may carry a user equipment identifier, priority information, and/or a user equipment group identifier.

When the user equipment 10 is used for the first time, the network connection request sent by the user equipment 10 to the MME 20 is an attach connection request, and the MME 20 may control establishment of an attach process according to a priority of the attach connection request and the network overload state.

When the user equipment 10 is not used for the first time, that is, the user equipment 10 completes an attach process having a low priority with a network and establishes a connection having a low priority to the network, when the network is overloaded, the MME 20 rejects a connection request having a low priority of the user equipment 10. If the user equipment 10 needs to send service data having a non-low priority, the user equipment 10 needs to establish a network connection having a non-low priority, so that the user equipment 10 may send, to the MME 20, a PDN connection request carrying non-low priority information, and establish the connection having a non-low priority between the user equipment 10 and the network by means of the PDN connection request. When the connection request sent by the user equipment 10 to the MME 20 is a PDN connection request carrying low priority information, the MME 20 may control, according to a priority of the PDN connection request and the network overload state, the user equipment 10 to establish the connection having a non-low priority to the network.

Optionally or further, that the MME 20 determines the network overload state includes the MME 20 may determine the network overload state according to an idle state of network resources. For example, if the MME 20 determines that an idle network resource exists, the MME 20 determines that the network is not overloaded, if the MME 20 determines that no idle network resource exists, the MME 20 determines that the network is overloaded.

Optionally, the MME 20 may determine the network overload state according to a network overload control command. For example, if the MME 20 determines that the network overload control command is received, the MME 20 determines that the network is overloaded. If the MME 20 determines that no network overload control command is received, the MME 20 determines that the network is not overloaded.

It can be understood that, the network overload control command can be triggered when a device operator or manufacturer maintains a device or be triggered when a device is faulty.

Step 230: The MME 20 controls a connection between the user equipment 10 and the network according to the priority of the network connection request and the network overload state. Specifically, the MME 20 rejects the network connection request of the user equipment 10 when the priority of the network connection request is a low priority and the network is overloaded, and sends a back-off timer to the user equipment 10.

Figure 4:
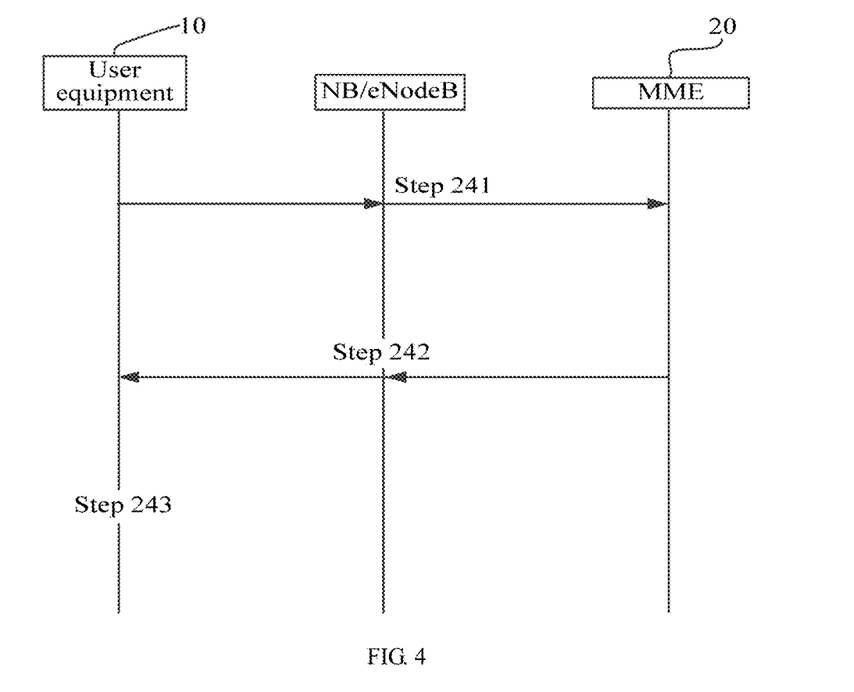
FIG. 4 is a schematic diagram of a process in which the MME rejects a network connection request of the user equipment according to the first embodiment of the present invention.

For example, as shown in FIG. 4, FIG. 4 is a schematic diagram of a process in which the MME 20 rejects the network connection request of the user equipment 10.

Step 241: The MME 20 receives the network connection request sent by the user equipment 10.

Step 242: If the MME 20 determines that the priority of the connection request is a low priority, and determines that the network is overloaded, the MME 20 rejects the connection request having a low priority, and sends, to the user equipment 10, a rejecting message carrying a back-off time.

Step 243: The MME 20 does not receive, in the back-off time, any network connection request having a low priority sent by the user equipment 10.

Optionally, the user equipment 10 may activate, according to the rejecting message, the back-off timer to start timing, and the user equipment 10 no longer sends any connection request having a low priority to the MME 20 in the back-off time.

In this embodiment, under the circumstance that the network is overloaded, the MME 20 rejects the network connection request having a low priority sent by the user equipment 10, which can save network resources and protect establishment of a network connection having a non-low priority.

Optionally, when the MME 20 determines that the priority of the network connection request is a low priority or a non-low priority, and determines that the network is not overloaded, the MME 20 controls the user equipment 10 to establish a network connection having a low priority or a non-low priority.

Optionally, when the MME 20 determines that the priority of the network connection request is a low priority, and determines that the network is overloaded, the MME 20 rejects the network connection request having a low priority; after the rejecting message carrying the back-off time is sent to the user equipment 10, the MME 20 receives, in the back-off time, a second network connection request sent by the user equipment 10. If the MME 20 determines that a priority of the second network connection request is a non-low priority, the MME 20 sends a timing stop message to the user equipment 10, and controls the user equipment 10 to establish the connection having a non-low priority to the network. A process of establishing a network connection having a non-low priority is used below as an example for description.

Figure 5:
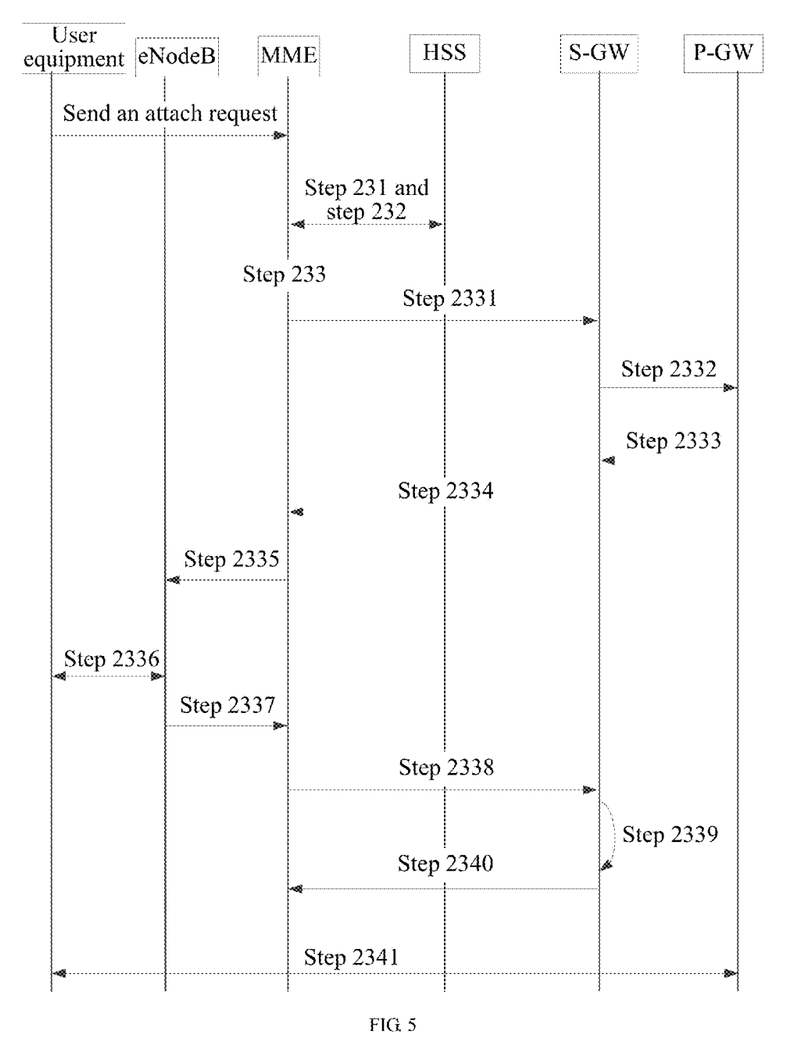
FIG. 5 is a schematic diagram of a process in which the MME controls a preset user equipment group to establish a connection having a non-low priority to a network according to the first embodiment of the present invention.

FIG. 5 is a schematic diagram of a process in which the MME 20 controls the user equipment 10 to establish a connection having a non-low priority to the network according to the first embodiment of the present invention.

When the network connection request is an attach request, and a priority of the attach request is a non-low priority, the MME 20 controls the user equipment 10 to establish a network connection having a non-low priority. Specifically, step 231 is performed.

When the user equipment 10 has already established a bearer having a low priority to a network, and when the user equipment 10 needs to send service data having a non-low priority, the bearer having a low priority cannot implement transmission of the service data having a non-low priority. Then the user equipment 10 establishes a network connection having a non-low priority by sending a PDN connection request having a non-low priority. Specifically, step 233 is performed, where the attach request or the PDN connection request carries an identifier, and/or priority information, and/or a group identifier of the user equipment 10.

Step 231: The MME 20 sends a location update request to an HSS according to the network connection request.

Step 232: The HSS, in response to the location update request, sends subscription data of the user equipment 10 to the MME 20, where the subscription data includes subscription information, such as a subscription group identifier of the user equipment 10.

Step 233: If the MME 20 determines, according to the subscription information, that the user equipment 10 belongs to a preset user equipment group, the MME 20 establishes a public bearer having a non-low priority or a public PDN connection having a non-low priority for a user equipment in the preset user equipment group according to a trigger request of the user equipment 10, so that other user equipment in the preset user equipment group may use the public bearer or public PDN connection to perform data transmission.

Specifically, step 2331: The MME 20 sends a create session request message to an S-GW, where the request message carries public bearer information, such as the group identifier and a public bearer identifier.

Step 2332: The S-GW sends the create session request message to a P-GW, where the request message carries the public bearer information, such as the group identifier and the public bearer identifier.

It can be understood that, the S-GW determines whether a public bearer has been established for the user equipment group, and if the public bearer has been established, step 2334 is performed; otherwise, a create session request is sent to the P-GW.

Step 2333: The P-GW generates an accounting ID for the public bearer, and sends a create session response message to the S-GW, where the response message carries a public bearer resource, such as a public bearer identifier.

Step 2334: The S-GW sends the create session response message to the MME 20, where the response message carries a public bearer resource, such as the public bearer identifier.

Step 2335: The MME 20 sends an attach accept message or a PDN connection accept message to a base station eNodeB, where the accept message carries public bearer information, such as the public bearer identifier.

Step 2336: The base station eNodeB and the user equipment 10 complete a Radio Resource Control (RRC) connection reallocation process, and establish a radio access bearer.

Step 2337: The base station eNodeB sends an attach complete message or a PDN connection complete message to the MME 20, where the message carries a public bearer resource, such as the public bearer identifier, an eNodeB address, and an identifier, e.g. a terminal endpoint identifier (TEID).

Step 2338: The MME 20 sends a modify bearer request message to the S-GW, where the message carries a public bearer resource, such as the public bearer identifier, the eNodeB address, and a channel port identifier TEID.

Step 2339: The S-GW creates a mapping between the public bearer and the access bearer. For example, a mapping among an identifier of the user equipment 10 or an Internet Protocol (IP) address of the user equipment 10, a group identifier, a public bearer identifier, an eNodeB TEID, a S-GW TEID and so on is established.

Step 2340: The S-GW sends a modify bearer response message to the MME 20.

Step 2341: The user equipment 10 of the preset user equipment group sends or receives data by means of the public bearer.

For example, when the user equipment 10 of the preset user equipment group sends the data, an uplink data packet is sent to the S-GW by means of the access bearer, then the S-GW finds a corresponding S-GW TEID or public bearer identifier according to the identifier or IP address or group identifier of the user equipment 10, forwards the data to a corresponding public bearer port, and sends the data to the P-GW by means of the public bearer port. The public bearer and a default bearer having a non-low priority may transmit service data having a non-low priority, and may also transmit service data having a low priority; each user equipment 10 belonging to the preset user equipment group may transmit the service data by means of the public bearer.

In this embodiment, the MME 20 controls the preset user equipment group to establish a public bearer or a public PDN connection, so that the user equipment 10 belonging to the preset user equipment group may transmit service data having a low priority or a non-low priority by means of the public bearer, or transmit service data having a non-low priority by means of the public PDN connection, which avoids repeatedly establishing a respective bearer or PDN connection for each user equipment 10 belonging to the preset user equipment group, thereby saving network resources.

Optionally, in step 233, if the MME 20 determines, according to the subscription information of the user equipment 10, that the user equipment 10 does not belong to the preset user equipment group, the MME 20 controls the single user equipment 10 to establish a bearer having a non-low priority or a PDN connection having a non-low priority.

Figure 6:
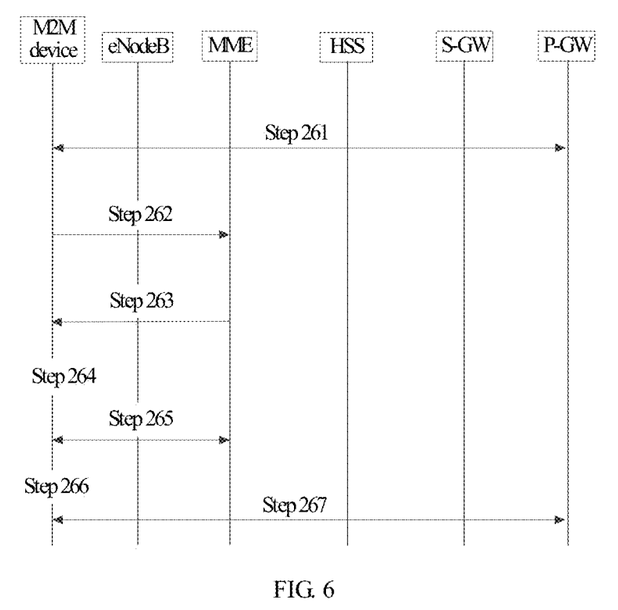
FIG. 6 is a schematic diagram of controlling a single user equipment to establish a PDN connection having a non-low priority to a network by the MME according to the first embodiment of the present invention.

FIG. 6 is a schematic diagram of controlling the single user equipment 10 to establish a connection having a non-low priority to a network by the MME 20 according to the first embodiment of the present invention. A process of establishing a network connection having a non-low priority is described by using an example in which the network connection having a non-low priority is established after a network connection having a low priority is established between the user equipment 10 and the network.

Step 261: The user equipment 10 is attached to the network to establish a bearer having a low priority.

Step 262: The user equipment 10 sends a service data transmission request having a low priority.

Step 263: The MME 20 determines that a priority of the transmission request is a low priority, and if the network is overloaded, the MME 20 refuses to receive the request of the user equipment 10, and sends, to the user equipment 10, a rejecting message carrying a back-off time; if the network is not overloaded, step 267 is performed.

Step 264: The user equipment 10 starts timing of a back-off timer according to the back-off time in the rejecting message, and does not send a connection request having a low priority within a timing time.

Step 265: The MME 20 receives a PDN connection request having a non-low priority of the user equipment 10, and sends a timing stop command to the user equipment 10.

Step 266: The user equipment 10 stops timing of the back-off timer according to the timing stop command, and allows the user equipment 10 to send a network connection request having a low priority.

Step 267: The MME 20 controls establishment of the PDN connection having a non-low priority between the user equipment 10 and the network according to the PDN connection request having a non-low priority.

It can be understood that the single user equipment 10 may also send an attach request having a non-low priority to the MME 20, and if the MME 20 determines that a priority of the attach request is a non-low priority, the MME 20 accepts the attach request, and establishes a network connection having a non-low priority for the user equipment 10.

It can be understood that the process in which the single user equipment 10 establishes the network connection having a non-low priority or a low priority to the network is similar to the foregoing process in which the preset user equipment group establishes a public bearer or a public PDN connection to the network, which is not described herein again.

It can be understood that, if the user equipment 10 supports multiple PDN connections, the priority information may further include different APNs. The MME 20 identifies connection requests having different priorities according to different APN values. For example, APN1 indicates a connection request having a low priority, and APN2 indicates a connection request having a non-low priority. The MME 20 may determine a priority of a connection request according to the APN value.

It can be understood that, for the user equipment 10 supporting a single PDN connection, an existing PDN connection needs to be deleted and a new PDN connection needs to be established before a new PDN connection request is initiated. A specific process in which the PDN connection is deleted is a technology known by a person skilled in the art, does not affect clear descriptions of the main technical solution in the embodiment of the present invention, and is not described herein again.

It can be understood that the MME 20 may also predefine a limit value for the user equipment 10 that may establish a network connection having a non-low priority. When the MME 20 determines that the number of user equipment 10 having established the network connections having a non-low priority exceeds the limit value, whether the network is overloaded or not, the MME 20 rejects the connection request having a non-low priority sent by the user equipment 10.

It can be further understood that, for the user equipment 10 belonging to the preset user equipment group, the MME 20 may further set a limit value for the number of user equipment belonging to the preset user equipment group and establishing connections having a non-low priority to the network. When the MME 20 determines that the number of the user equipment establishing connections having a non-low priority to the network and in the preset user equipment group exceeds the limit value, the MME 20 rejects the connection request having a non-low priority sent by the user equipment 10. The MME 20 protects the network by controlling the number of the user equipment establishing network connections, which avoids network paralysis caused by occupancy of network resources by multiple user equipment unlimitedly establishing network connections having a non-low priority.

It can be further understood that an order in which the MME 20 determines the priority of the network connection request and determines the network overload state is not limited. In this embodiment of the present invention, the mobility management entity MME 20 may selectively control the connection between the user equipment 10 and the network by determining the priority of the network connection request and the network overload state.

Figure 7:
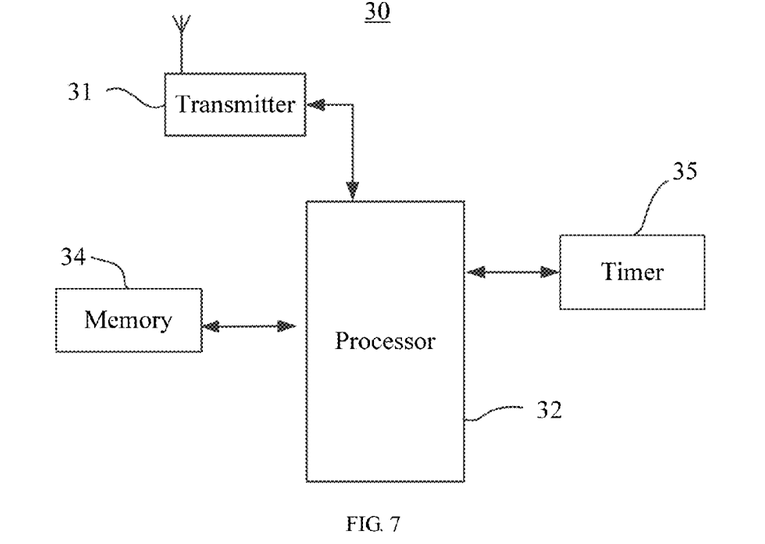
FIG. 7 is a schematic structural diagram of a MME that controls a connection between a user equipment and a network according to a second embodiment of the present invention.

According to the descriptions of the foregoing embodiment, FIG. 7 is a schematic structural diagram of a mobility management entity MME 30 that controls a connection between a user equipment and a network according to a second embodiment of the present invention.

Based on the first embodiment of the present invention, the mobility management entity MME 30 may be applied to a 3GPP Evolved Packet System (EPS), and the EPS includes: an Evolved Universal Terrestrial Radio Access Network (E-UTRAN), a Mobility Management Entity (MME), a Serving Gateway (S-GW), a Packet Data Network Gateway (P-GW), a Home Subscriber Server (HSS), a 3GPP Authentication, Authorization and Accounting (AAA) server, a Policy and Charging Rules Function (PCRF) and other support nodes. The MME 30 is responsible for functions, such as mobility management, processing of Non-Access-Stratum (NAS) signaling, control plane related operations such as management of a user mobility context, reachability management for a mobile terminal in an idle state selected by the P-GW and the S-GW, and selecting of a tracking area list.

The MME 30 includes a transceiver 31 and a processor 32. The transceiver 31 receives a network connection request sent by a user equipment 10; the processor 32 determines a priority of the network connection request and a network overload state, and further controls a connection between the user equipment 10 and a network according to the priority of the network connection request and the network overload state.

In this embodiment of the present invention, the mobility management entity MME 30 may selectively control the connection between the user equipment 10 and the network by determining the priority of the network connection request and the network overload state.

The transceiver 31 is configured to receive and send information in an information receiving and sending process or a call process, and the transceiver 31 may communicate with other devices by using a wireless communications system and the network. According to the embodiment of the present invention, the transceiver 31 receives the network connection request sent by the user equipment 10, and sends, according to the priority of the network connection request and the network overload state, information about controlling establishment of the connection between the user equipment 10 and the network.

That the processor 32 determines a priority of the network connection request includes: the processor 32 determines whether priority information is carried in the network connection request; and if priority information is carried, the priority of the network connection request is determined according to the priority information; if the priority information is not carried, it is determined that the priority of the network connection request is a non-low priority.

The priority information is preconfigured in the user equipment 10, and a configuration process of the priority is based on the first embodiment and similar to the process of configuring the priority information described in FIG. 3.

Optionally or further, that the processor 32 determines the network overload state includes: the processor 32 may determine the network overload state according to an idle state of network resources.

For example, if the processor 32 determines that an idle network resource exists, the processor 32 determines that the network is not overloaded; if the processor 32 determines that no idle network resource exists, the processor 32 determines that the network is overloaded.

Optionally, the processor 32 may determine the network overload state according to a network overload control command.

For example, if the processor 32 determines that the network overload control command is received, the processor 32 determines that the network is overloaded; if the processor 32 determines that no network overload control command is received, the processor 32 determines that the network is not overloaded.

It can be understood that, the network overload control command can be triggered when a device operator or manufacturer maintains a device or be triggered when a device is faulty.

Further, that the processor 32 controls a connection between the user equipment 10 and a network according to the priority of the network connection request and the network overload state includes: the processor 32 rejects the network connection request of the user equipment 10 according to that the priority of the network connection request is a low priority and the network is overloaded, and sends, to the user equipment 10, a rejecting message carrying a back-off time; and the processor 32 does not receive, in the back-off time, the network connection request having a low priority sent by the user equipment 10.

Optionally, if the processor 32 determines that the priority of the network connection request is a low priority or a non-low priority, and determines that the network is not overloaded, the MME 30 controls the user equipment 10 to establish a network connection having a low priority or a non-low priority.

Optionally, after the processor 32 determines that the priority of the network connection request is a low priority, determines that the network is overloaded, rejects the network connection request having a low priority, and sends, to the user equipment 10, the rejecting message carrying the back-off time, the processor 32, in the back-off time, receives a second network connection request sent by the user equipment 10, sends a timing stop message to the user equipment 10 if it is determined that a priority of the second network connection request is a non-low priority, and controls establishment of a connection having a non-low priority between the user equipment 10 and the network.

After the processor 32 determines that the user equipment 10 meets a condition of establishing the connection having a non-low priority to the network, the controlling establishment of a connection having a non-low priority between the user equipment 10 and the network includes: if the processor 32 determines, according to subscription information of the user equipment 10, that the user equipment 10 belongs to a preset user equipment group, the processor 32 controls the user equipment 10 to establish a public bearer having a non-low priority or a public PDN connection having a non-low priority according to a connection request having a non-low priority of the user equipment 10.

Optionally, if the processor 32 determines, according to subscription information of the user equipment 10, that the user equipment 10 does not belong to a preset user equipment group, the processor 32 controls the user equipment 10 to establish a single bearer having a non-low priority or a single PDN connection having a non-low priority to the network. In this embodiment, the process in which the processor 32 controls the user equipment 10 to establish a network connection is similar to that in the first embodiment, and is not described herein again.

It can be understood that, if the user equipment 10 supports multiple PDN connections, the priority information may further include different APNs. The processor 32 identifies connection requests having different priorities according to different APN values. For example, APN1 indicates a connection request having a low priority, and APN2 indicates a connection request having a non-low priority. The processor 32 may determine a priority of a connection request according to the APN value.

It can be understood that, for the user equipment 10 supporting a single PDN connection, an existing PDN connection needs to be deleted and a new PDN connection needs to be re-established before a new PDN connection request is initiated. A specific process in which the PDN connection is deleted is a technology known by a person skilled in the art, does not affect clear descriptions of the main technical solution in the embodiment of the present invention, and is not described herein again.

It can be understood that the processor 32 may also predefine a limit value for the user equipment 10 that may establish a network connection having a non-low priority. When the processor 32 determines that the user equipment 10 establishing the network connection having a non-low priority exceeds the limit value, whether the network is overloaded or not, the processor 32 rejects the connection request having a non-low priority sent by the user equipment 10.

It can be further understood that, for the user equipment 10 belonging to the preset user equipment group, the processor 32 may further set a limit value for the number of user equipment belonging to the preset user equipment group and establishing connections having a non-low priority to the network. When the processor 32 determines that the number of the user equipment establishing connections having a non-low priority to the network and in the preset user equipment group exceeds the limit value, the processor 32 rejects the connection request having a non-low priority sent by the user equipment 10. The processor 32 protects the network by controlling the number of the user equipment establishing network connections, which avoids network paralysis caused by occupancy of network resources by unlimitedly establishing the network connections having a non-low priority by multiple user equipment.

It can be further understood that, an order in which the processor 32 determines the priority of the network connection request and determines the network overload state is not limited.

In this embodiment, the MME 30 may further include a memory 34, and the memory 34 may be configured to store an uplink control instruction or data information sent by an user equipment 10, and store uplink and downlink control signaling and data information between the MME 30 and the S-GW or between the MME 30 and the P-GW. The memory 34 may be integrated with the HSS.

According to the embodiment of the present invention, the mobility management entity MME 30 may selectively control the connection between the user equipment 10 and the network by determining the priority of the network connection request and the network overload state.

Figure 8:
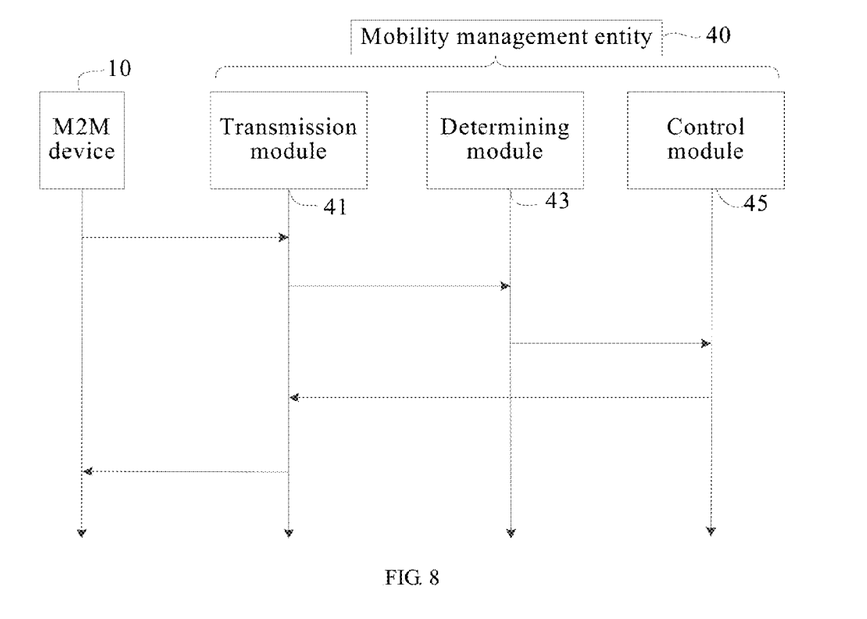
FIG. 8 is a schematic diagram of a mobility management entity that controls a connection between a user equipment and a network according to a third embodiment of the present invention.

FIG. 8 is a schematic diagram of a mobility management entity that controls a connection between a user equipment and a network according to a third embodiment of the present invention.

A technical solution of this embodiment is further described based on the technical solution described in the first embodiment of the present invention. A mobility management entity 40 includes a transmission module 41, a determining module 43, and a control module 45.

The transmission module 41 receives a network connection request sent by a user equipment 10.

The determining module 43 determines a priority of the network connection request and a network overload state.

The control module 45 controls a connection between the user equipment 10 and the network according to the priority of the network connection request and the network overload state.

According to the embodiment of the present invention, the MME 40 may selectively control the connection between the user equipment 10 and the network by determining the priority of the network connection request and the network overload state.

The transmission module 41 receives a network connection request which carries priority information sent by the user equipment 10, where the priority information indicates the priority of the network connection request; or receives a network connection request which does not carry priority information and is sent by the user equipment 10.

The priority information may indicate that the priority of the network connection request is a low priority or a non-low priority. In other embodiments, the non-low priority may further include multiple levels, such as a medium priority and a high priority. The priority information is preconfigured in the user equipment 10, and a configuration process of the priority is based on the first embodiment and similar to the process of configuring the priority information described in FIG. 3.

That the determining module 43 determines a priority of the network connection request includes: the determining module 43 determines whether the network connection request carries the priority information; and if priority information is carried, the priority of the network connection request is determined according to the priority information; if the priority information is not carried, it is determined that the priority of the network connection request is a non-low priority.

Optionally or further, that the determining module 43 determines the network overload state includes: the determining module 43 may determine the network overload state according to an idle state of network resources.

For example, if the determining module 43 determines that an idle network resource exists, the determining module 43 determines that the network is not overloaded; if the determining module 43 determines that no idle network resource exists, the determining module 43 determines that the network is overloaded.

Optionally, the determining module 43 may determine the network overload state according to a network overload control command.

For example, if the determining module 43 determines that the network overload control command is received, the determining module 43 determines that the network is overloaded; if the determining module 43 determines that no network overload control command is received, the determining module 43 determines that the network is not overloaded.

It can be understood that, the network overload control command can be triggered when a device operator or manufacturer maintains a device or be triggered when a device is faulty.

Further, that the control module 45 controls a connection between the user equipment 10 and the network according to the priority of the network connection request and the network overload state includes: the control module 45 rejects the network connection request of the user equipment 10 according to that the priority of the network connection request is a low priority and the network is overloaded, and sends, to the user equipment 10, a rejecting message carrying a back-off time; and the control module 45 does not receive, in the back-off time, the network connection request having a low priority sent by the user equipment 10.

Optionally, if the control module 45 determines that the priority of the network connection request is a low priority or a non-low priority, and determines that the network is not overloaded, the control module 45 controls the user equipment 10 to establish a network connection with a low priority or a non-low priority.

Optionally, after the control module 45 determines that the priority of the network connection request is a low priority, determines that the network is overloaded, rejects the network connection request having a low priority and sends, to the user equipment 10, the rejecting message carrying the back-off time, the control module 45, in the back-off time, receives a second network connection request sent by the user equipment 10; sends a timing stop message to the user equipment 10 if it is determined that a priority of the second network connection request is a non-low priority, the control module 45, and controls establishment of a connection having a non-low priority between the user equipment 10 and the network.

After the control module 45 determines that the user equipment 10 meets a condition of establishing the connection having a non-low priority to the network, that the controlling establishment of a connection having a non-low priority between the user equipment 10 and the network includes: if the control module 45 determines, according to subscription information of the user equipment 10, that the user equipment 10 belongs to a preset user equipment group, the control module 45 controls the user equipment 10 to establish a public bearer having a non-low priority or a public PDN connection having a non-low priority according to a connection request having a non-low priority of the user equipment 10.

Optionally, if the control module 45 determines, according to subscription information of the user equipment 10, that the user equipment 10 does not belong to a preset user equipment group, the control module 45 controls the user equipment 10 to establish a single bearer having a non-low priority or a single PDN connection having a non-low priority to the network. In this embodiment, the process in which the control module 45 controls the user equipment 10 to establish a network connection is similar to that in the first embodiment, and is not described herein again.

It can be understood that, if the user equipment 10 supports multiple PDN connections, the priority information may further include different APNs. The control module 45 identifies connection requests having different priorities according to different APN values. For example, APN1 indicates a connection request having a low priority, and APN2 indicates a connection request having a non-low priority. The control module 45 may determine a priority of a connection request according to the APN value.

It can be understood that, for the user equipment 10 supporting the single PDN connection, an existing PDN connection needs to be deleted and a new PDN connection needs to be established before a new PDN connection request is initiated. A specific process in which the PDN connection is deleted is a technology known by a person skilled in the art, does not affect clear descriptions of the main technical solution in the embodiment of the present invention, and is not described herein again.

It can be understood that, the control module 45 may also predefine a limit value for the user equipment 10 that may establish a network connection having a non-low priority. When the control module 45 determines that the user equipment 10 establishing the network connection having a non-low priority exceeds the limit value, whether the network is overloaded or not, the control module 45 rejects the connection request having a non-low priority sent by the user equipment 10.

It can be further understood that, for the user equipment 10 belonging to the preset user equipment group, the control module 45 may further set a limit value for the number of user equipment belonging to the preset user equipment group and establishing connections having a non-low priority to the network. When the control module 45 determines that the number of the user equipment establishing connections having a non-low priority to the network and in the preset user equipment group exceeds the limit value, the control module 45 rejects the connection request having a non-low priority sent by the user equipment 10. The control module 45 protects the network by controlling the number of the user equipment establishing network connections, which avoids network paralysis caused by occupancy of network resources by unlimitedly establishing the network connections having a non-low priority by multiple user equipment.

It can be further understood that an order in which the control module 45 determines the priority of the network connection request and determines the network overload state is not limited.

According to the embodiment of the present invention, the MME 40 may selectively control the connection between the user equipment 10 and the network by determining the priority of the network connection request and the network overload state.

Figure 9:
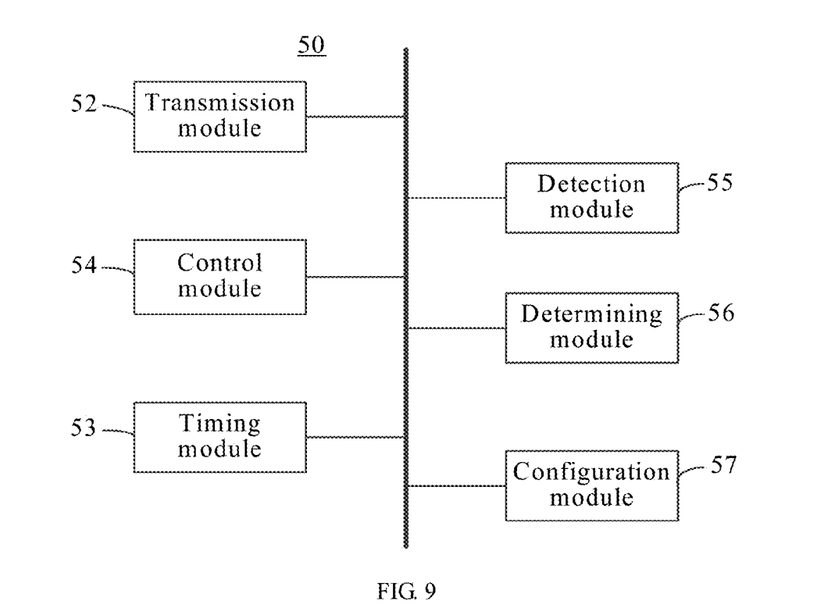
FIG. 9 is a structural diagram of a user equipment that controls a connection to a network according to a fourth embodiment of the present invention.

FIG. 9 is a structural diagram of a user equipment 50 that controls a connection to a network according to a fourth embodiment of the present invention.

The user equipment 50 in the embodiment of the present invention may be an M2M device, for example, a fixed or mobile machine-to-machine communications device such as a temperature tester, or a water/electricity meter.

The user equipment 50 includes a transmission module 52, a timing module 53, and a control module 54, wherein the transmission module 52 sends a network connection request to a mobility management entity; the transmission module 52 receives a rejecting message which carries a back-off time and is sent by the mobility management entity; the timing module 53 starts a timer according to the back-off time in the rejecting message; and the control module 54, in the back-off time, forbids the user equipment 50 to send a network connection request having a low priority, and allows the user equipment 50 to send a network connection request having a non-low priority.

The user equipment 50 in the embodiment of the present invention, according to the rejecting message sent by the mobility management entity, forbids the user equipment 50 to send the network connection request having a low priority, and allows the user equipment 50 to send the network connection request having a non-low priority, which prevents the user equipment 50 from continuously sending network connection requests having a low priority to a network, and avoids blocking the network.

That the transmission module 52 sends a network connection request to a mobility management entity includes: the transmission module 52 may send, to the mobility management entity, a network connection request which carries priority information, or send, to the mobility management entity, a network connection request which does not carry priority information.

It can be understood that, if the network connection request does not carry the priority information, the mobility management entity may determine that the default priority of the network connection request is a non-low priority.

It can be understood that, when the user equipment 50 acquires service data having a non-low priority, the control module 54, in the back-off time, controls the user equipment 50 to send a network connection request having a non-low priority to the mobility management entity, and stops timing of the timer according to timing stop signaling sent for the network connection request having a non-low priority by the mobility management entity.

The user equipment 50 in the embodiment of the present invention may further include a detection module 55, a determining module 56, and a configuration module 57, where the detection module 55 is configured to detect and acquire service data, such as temperature data and water/electricity data.

The determining module 56 determines a priority of the service data acquired by the detection module 55.

The configuration module 57 configures priority information corresponding to the priority of the service data.

For specific solutions executed by the determining module 56 and the configuration module 57, refer to the descriptions in the first embodiment, which are not described herein again. The user equipment 50 in the embodiment of the present invention, according to the rejecting message sent by the mobility management entity, forbids the user equipment 50 to send network connection request having a low priority, and allows the user equipment 50 to send network connection request having a non-low priority, which prevents the user equipment 50 from continuously sending network connection requests having a low priority to a network, and avoids blocking the network.

Figure 10:
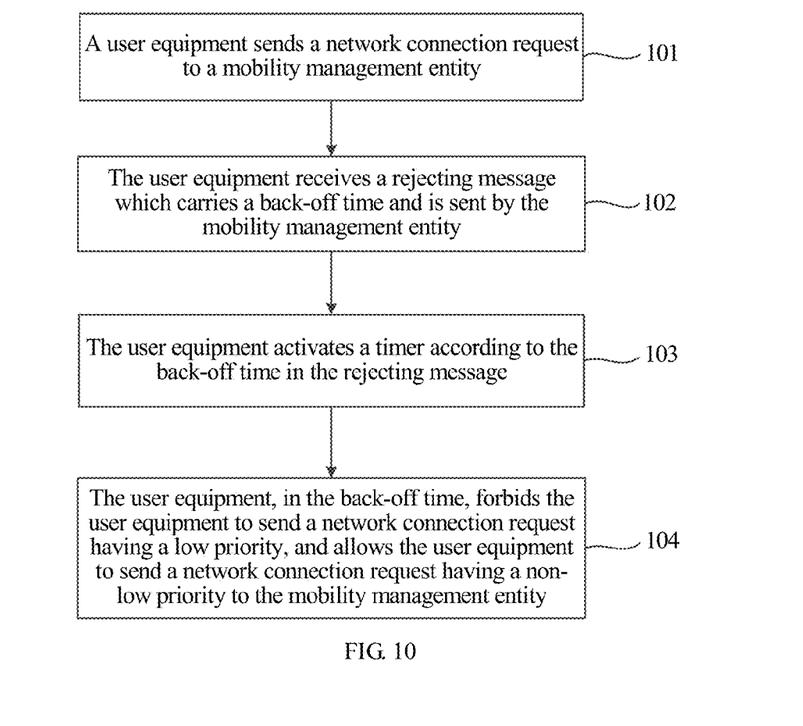
FIG. 10 is a flowchart of a method for controlling a connection between a user equipment and a network according to a fifth embodiment of the present invention.

FIG. 10 is a flowchart of a method for controlling a connection between a user equipment and a network according to a fifth embodiment of the present invention.

The method for controlling the connection between the user equipment 50 and the network includes:

Step 101: The user equipment 50 sends a network connection request to a mobility management entity.

Step 102: The user equipment 50 receives a rejecting message which carries a back-off time and is sent by the mobility management entity.

Step 103: The user equipment 50 starts a timer according to the back-off time in the rejecting message.

Step 104: The user equipment 50, in the back-off time, forbids the user equipment to send a network connection request having a low priority, and allows the user equipment to send a network connection request having a non-low priority to the mobility management entity.

According to the method for controlling the connection between the user equipment 50 and the network in the embodiment of the present invention, the user equipment 50 is, according to the rejecting message sent by the mobility management entity, forbidden to send the network connection request having a low priority, and allowed to send the network connection request having a non-low priority, which prevents the user equipment 50 from continuously sending network connection requests having a low priority to a network, and avoids blocking the network.

In step 101, the user equipment 50 may send, to the mobility management entity 60, a network connection request which carries priority information, or send, to the mobility management entity, a network connection request which does not carry priority information.

In step 104, that the user equipment 50 is allowed to send the network connection request having a non-low priority to the mobility management entity in the back-off time includes: in the back-off time, when the user equipment 50 acquires the service data having a non-low priority, the user equipment 50 sends the network connection request having a non-low priority to the mobility management entity.

After the user equipment 50 controls, in the back-off time, the user equipment 50 to send the network connection request having a non-low priority to the mobility management entity, the method further includes: the user equipment 50 stops timing of the timer according to timing stop signaling sent for the network connection request having a non-low priority by the mobility management entity.

According to the method for controlling the connection between the user equipment and the network in this embodiment, the user equipment 50 is, according to the rejecting message sent by the mobility management entity, forbidden to send the network connection request having a low priority, and allowed to send the network connection request having a non-low priority, which may selectively control the connection between the user equipment and the network.

It should be understood by a person of ordinary skill in the art that exemplary modules and algorithm steps described with reference to the disclosed embodiments of this specification may be implemented by means of electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should be considered that the implementation does not go beyond the scope of the present invention.

It should be clearly understood by a person skilled in the art that for ease and brevity of description, reference may be made to corresponding processes in the foregoing method embodiments for the specific working processes of the electronic devices, devices, and modules described above, which are not described herein again.

In several embodiments provided in this application, it should be understood that, the disclosed system, device, and method may be implemented in other manners. The electronic device embodiments described above are merely exemplary, for example, the division of the modules is merely division according to logical functions, and another division manner may be available when actual implementation is performed.

In addition, various function modules in the embodiments of the present invention may be integrated in one processing device, or modules may exist physically independently, or two or more than two modules may be integrated in one device.

When the function is implemented in a software function device form and is sold or used as an independent product, the function may be stored in a computer readable storage medium. Based on such an understanding, the technical solutions of the present invention essentially, or the part contributing to the prior art, or a part of the technical solutions may be implemented in a form of a software product. The computer software product is stored in a storage medium, and includes several instructions for instructing a computer device (which may be a personal computer, a server, or a network device) to perform all or a part of the steps of the methods described in the embodiments of the present invention. The foregoing storage medium includes: any medium that can store program code, such as a universal serial bus (USB) flash drive, a removable hard disk, a read-only memory (ROM), a random access memory (RAM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for controlling a connection between a user equipment and a network, comprising:
   receiving, by a mobility management entity, a network connection request sent by the user equipment;
   determining, by the mobility management entity, a priority of the network connection request;
   determining, by the mobility management entity, the number of user equipment having established network connections having a non-low priority; and
   rejecting, by the mobility management entity, the connection request if the connection request has a non-low priority and the number of user equipment having established connections exceeds a limit value.

2. The method according to claim 1, wherein rejecting the connection request connection request comprises the mobility management entity sending to the user equipment, a rejecting message carrying a back-off time, and wherein after sending the rejecting message, the method further comprises:
   receiving, by the mobility management entity in the back-off time, a second network connection request sent by the user equipment; and
   sending a timing stop instruction to the user equipment and controlling establishment of a connection having a non-low priority between the user equipment and the network when the mobility management entity determines that a priority of the second network connection request is a non-low priority.

3. The method according to claim 2, wherein controlling, by the mobility management entity, establishment of the connection having a non-low priority between the user equipment and the network comprises controlling establishment of a bearer having a non-low priority or a packet data network (PDN) connection having a non-low priority between the user equipment and the network when the mobility management entity determines, according to subscription information of the user equipment, that the user equipment does not belong to a preset user equipment group.

4. The method according to claim 2, wherein controlling, by the mobility management entity, establishment of the connection between the user equipment and the network comprises controlling establishment of a public bearer having a non-low priority or a public PDN connection having a non-low priority between the user equipment and the network when the mobility management entity determines, according to subscription information of the user equipment, that the user equipment belongs to a preset user equipment group.

5. The method according to claim 1, wherein determining, by the mobility management entity, the priority of the network connection request comprises determining the priority of the network connection request according to the priority information when the mobility management entity determines that the network connection request carries priority information.

6. The method according to claim 5, wherein determining the priority of the network connection request according to the priority information comprises determining, by the mobility management entity, the priority of the network connection request according to a correspondence between an access point name (APN) and a priority in the priority information.

7. The method according to claim 1, wherein determining, by the mobility management entity, the priority of the network connection request comprises determining that the priority of the network connection request is a non-low priority when the mobility management entity determines that the network connection request does not carry priority information.

8. A mobility management entity, comprising:
a transceiver; and
a processor,
wherein the transceiver is configured to receive a network connection request sent by a user equipment, and wherein the processor is configured to:
determine a priority of the network connection request and a network overload state;
determine the number of user equipment having established network connections having a non-low priority; and
reject the connection request if the connection request has a non-low priority and the number of user equipment having established connections exceeds a limit value.

9. The mobility management entity according to claim 8, wherein
the transceiver is configured to send to the user equipment, a rejecting message carrying a back-off time.

10. The mobility management entity according to claim 9, wherein the transceiver is further configured to receive, in the back-off time, a second network connection request sent by the user equipment after sending, to the user equipment, the rejecting message carrying the back-off time, and wherein when the processor determines that a priority of the second network connection request is a non-low priority, the transceiver is configured to send a timing stop instruction to the user equipment, and the processor is configured to control establishment of a connection having a non-low priority between the user equipment and the network.

* * * * *